United States Patent [19]
Ganser et al.

[11] 3,880,027
[45] Apr. 29, 1975

[54] APPARATUS FOR MANUFACTURE OF ENDLESS BELTS

[75] Inventors: Wilhelm Ganser; Gottfried Raskin, both of Stolberg-Busbach, Germany

[73] Assignee: Uniroyal Aktiengesellschaft, Aachen-Rothe-Erde, Germany

[22] Filed: Apr. 20, 1973

[21] Appl. No.: 353,032

[30] Foreign Application Priority Data

Apr. 24, 1972 Germany ............ 2220042

[52] U.S. Cl. ............ 82/98; 82/100
[51] Int. Cl. ............ B23b 3/04
[58] Field of Search ........ 29/2.1; 82/46, 48, 98–101

[56] References Cited

UNITED STATES PATENTS

| | | | |
|---|---|---|---|
| 857,284 | 6/1907 | Huber | 82/46 X |
| 3,107,563 | 10/1963 | Sauer | 82/48 |
| 3,522,748 | 8/1970 | Treffner | 82/101 |

*Primary Examiner*—Andrew R. Juhasz
*Assistant Examiner*—Leon Gilden
*Attorney, Agent, or Firm*—Jay L. Chaskin, Esq.

[57] ABSTRACT

Apparatus and method for the manufacture of endless annular elements. A tubular blank is arranged on a rotatable radially expandable and contractible mandrel. Cutting elements are sequentially extended to penetrate the tubular blank to provide an endless annular element of a desired width.

5 Claims, 7 Drawing Figures

25
20
53
21
22
12
17
43
44
45
46
47
49
50
51
52
1

B
15
12
65
36
25
65a
27
24
20
21
22
30
29
17
31
53
43
44
45
46
54
55
49
48
1

75
75a
67a
73
D
d
66
72
65
73
74
67b
68
69
70
71

5
11
29
30
31
51
51a
76
77
78
79
80
81
82
83
85
86
87
88
89
90
91
92
93
94
95
96
97
98
99
100
101
102
103
104
105
106
107
108
109
110
111
112
113
114
115
117

118
119
120
121
121a
121b
121c
121d
121e
122
122a
122b
122c
122d
123
124
125
126
127
128
129
130
131

APPARATUS FOR MANUFACTURE OF ENDLESS BELTS

This invention relates to a method and apparatus for the manufacture of endless annular elements, and more particularly, to belts for the transmission of power or drive.

Throughout various industrial processes there is a need for endless annular elements of elastomeric, thermoplastic, plastic or similar materials. In the production of such annular elements, such as transmission or conveyor belts or belt drives in general, an extruded or molded tubular element, shell or pipe-like blank is formed.

These blanks may be comprised of a homogeneous material or may also contain fillers, reinforcements, reinforcing inserts, covering layers and the like. The blanks are fitted onto a work-piece holder or mandrel and a cutting means separates an individual annular element of the desired width. The cutting means, penetrates the tubular blank along a circumferential line and cuts the blank as the blank rotates. The cutting means, in the form of a pointed knife or a stationary circular knife, is on a movable carriage which is advanced in a direction parallel to the longitudinal extent of the tubular blank. The cutting means may be one or more knives, as desired by the structural configuration of the annular element. For example, only one knife is generally needed to make a cut perpendicular to the surface of the tubular blank so as to produce an endless annular element with a straight or vertical side. Further the penetration into the tubular blank may be at a desired angle so as to provide an endless annular element having sides at the desired angle. If two knives are arranged at a desired angle but in opposite senses of direction, an endless annular element having a tapered cross-section can be produced. The endless annular element may also have one straight side and one angular side.

Work-piece holders or mandrels to support the tubular blank made of a yielding material are known. Tubular blanks of large diameter are supported on one or more rotating mandrels. However, for tubular blanks of small diameter, correspondingly small diameter mandrels are required. The radial force exerted by the cutting means is of sufficient pressure to distort or bend the mandrel. A hollow mandrel is especially susceptible to the distortion caused by the pressure of the cutting means. The produced endless annular elements are therefore subject to irregularities in dimension. Tapered cuts are especially difficult because the tubular blank also has a tendency to slide axially on the mandrel. When the mandrel is of a hard material the cutting edge of the cutting means is rapidly dulled. Axial movement of the tubular blank will cause double-cuts in a taper cut as well as variations in width in taper and straight cuts.

In order to avoid the above disadvantages a radially expandable and contractible mandrel has been suggested. The mandrel of this type comprises a plurality of radially movable circumferentially arranged segments. In order to provide an uninterrupted peripheral surface, a cylindrical elastomeric casing is circumferentially arranged about the segments. The casing is rigidly attached to one of the segments to prevent rotation. When the segments are radially expanded against the casing the expanded periphery of the casing is flattened in the area of the gaps between adjacent segments. The casing therefore must be selectively reduced to avoid the flat surfaces.

It is an object of the present invention to provide a method and apparatus for the accurate and uniform manufacture of endless annular elements.

It is a further object of the present invention to provide a method for controlling a cutting means so as to produce from a tubular blank an endless annular element.

It is a further object of the present invention to provide an apparatus having a cutting means which penetrates a tubular blank to produce an endless annular element.

It is still a further object of the present invention to provide a method and apparatus for the accurate and uniform manufacture of annular belts having at least one tapered cut side.

It is another object of the present invention to provide a method and apparatus for the accurate and uniform manufacture of annular belts having at least one straight or parallel side.

The present invention comprises an apparatus having a radially expandable and contractible mandrel. The mandrel comprises a rigid tubular core circumferentially surrounded by a plurality of concentric yieldable plastic or elastomeric layers. Immediately adjacent the core is a radially expansible and contractible first layer formed by a spirally wrapped elastic hose. The hose is connected to a source of fluid pressure which will cause the hose to radially expanded. Disposed radially outward and immediately adjacent the spirally wrapped hose is a second or intermediate layer of a yieldable elastic member. The second or intermediate layer is firmly connected to the first layer formed by the hose. Concentrically disposed about the intermediate layer is a third layer of a yieldable elastic member. The third layer is not rigidly attached to the immediately radially inwardly adjacent intermediate but is detachably connected. The third layer forms the outer peripheral surface of the mandrel upon which is concentrically disposed the tubular blank. The elasticity of the three layers varies such that the elasticity diminishes from the first to the second to the third layer.

Disposed between the firmly connected first and second layers is a relatively non-expandable unyielding reinforcing layer.

The outer third layer forms a wear resistance surface for the penetrating cutting means. The outer third layer is readily removable from the underlying concentric layers for replacement due to wear. In comparison to the protective outer third layer, the second or intermediate layer is relatively thick. When the first layer is radially expanded by fluid pressure, the relatively thick intermediate layer retains a cylindrical shape.

The tubular blank is slipped onto the mandrel when the first layer is not pressurized. Fluid pressure is admitted to the hose causing the plurality of layers to radially expand and firmly support the tubular blank from rotation about the core or axial movement. The cutting means penetrates the tubular blank to the depth of the wear resistant outer third layer. As a consequence of the support of the tubular blank by the mandrel very accurate cuts can be achieved, as well as a uniform width for each endless annular element.

According to the method and apparatus of the present invention the cutting means includes two cutting knives which are sequentially controlled. The knives are actuated by fluid pressure such that a first knife penetrates the tubular blank before the second knife is advanced. The first knife completes a cutting cycle and remains in the extended position while the second knife advances and completes a cutting cycle. Both knives are then simultaneously returned to a retracted position. The cutting means is mounted on a carriage which is linearly movable coaxial with the tubular blank and the mandrel. The cutting means carriage is advanced a distance corresponding to the desired width of the endless annular element to be produced. The cutting means thereafter repeats the cutting cycle.

The invention will become more apparent and will be better understood with reference to the following detailed description and the accompanying drawings, in which.

Figure 2:
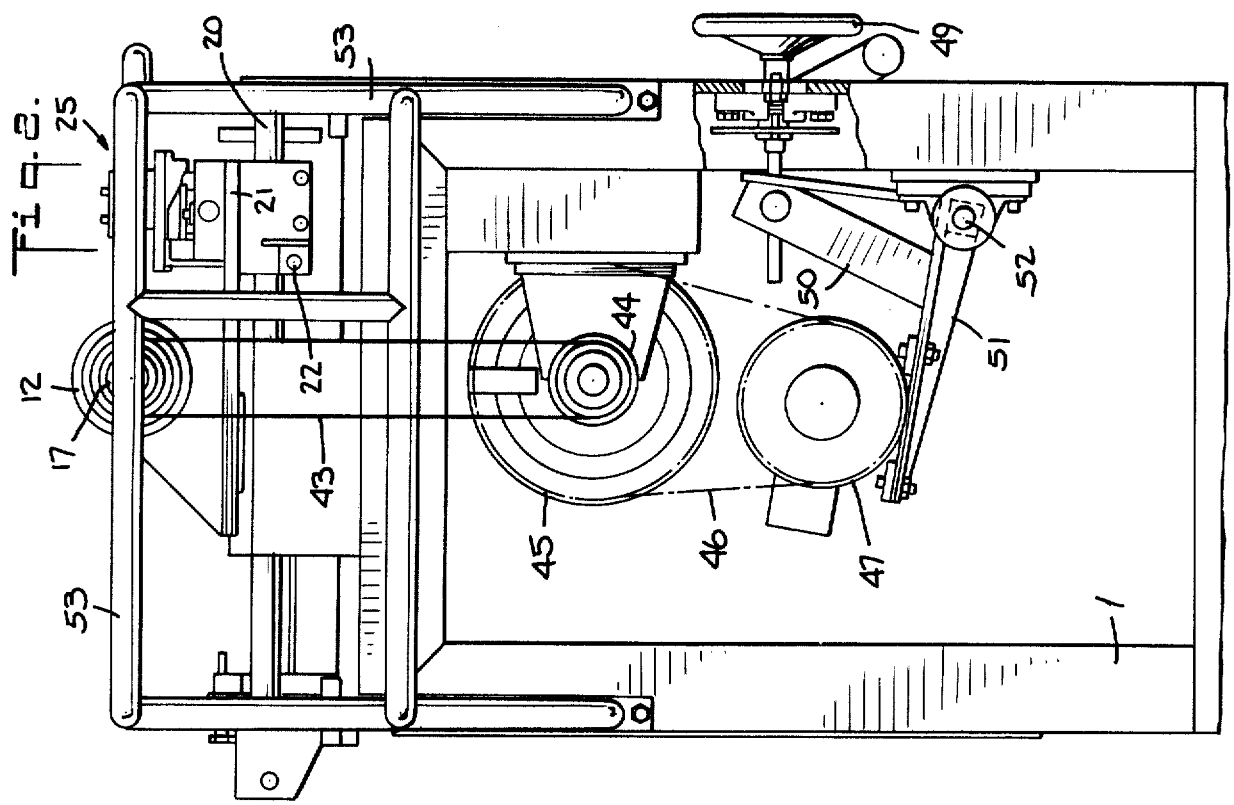
FIG. 2 is an end view, in partial section, of the apparatus of FIG. 1.
Figure 1:
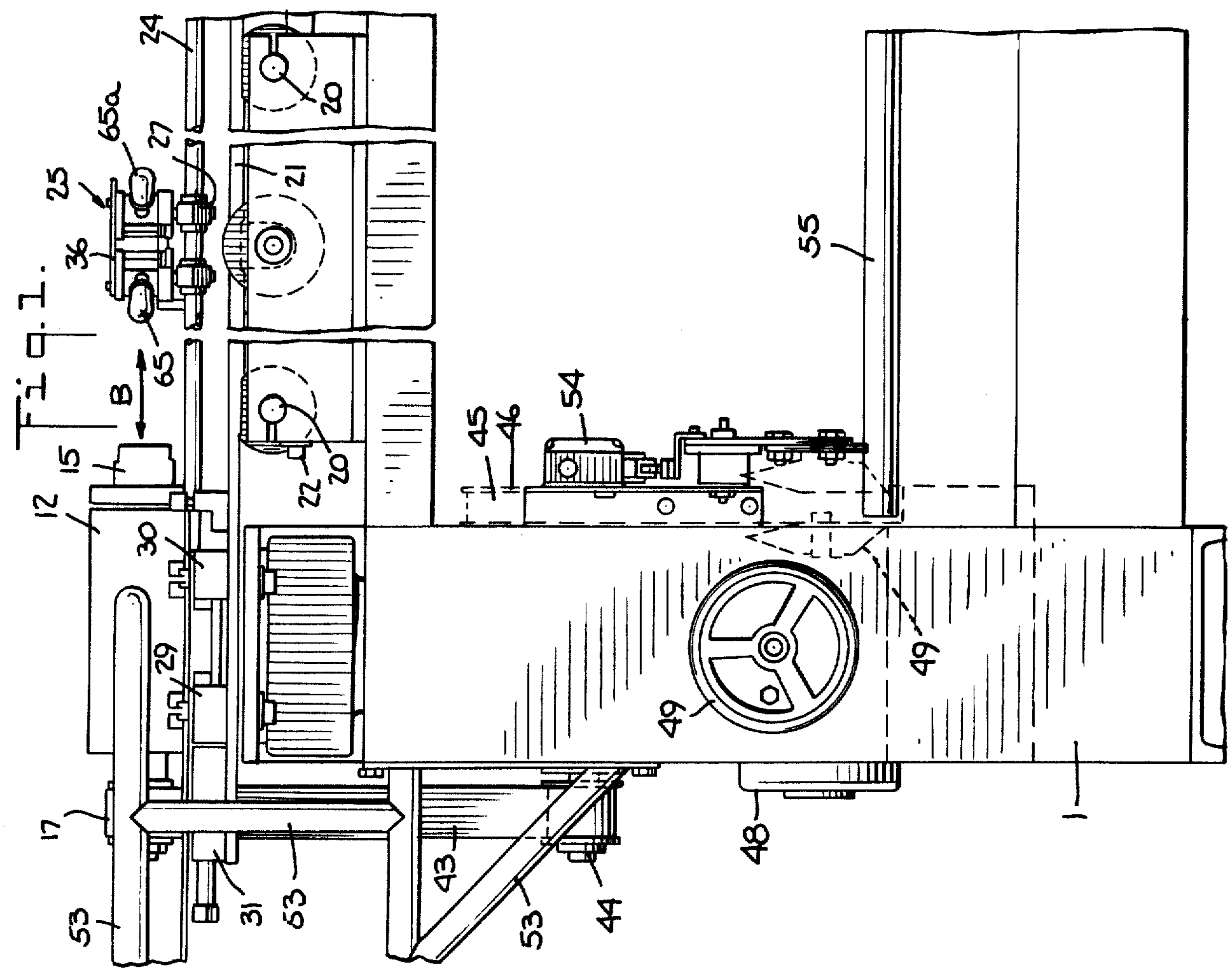
FIG. 1 is a front view of a portion of an apparatus, partially sectioned, in accordance with a preferred embodiment of the invention.
Figures 3, 4:
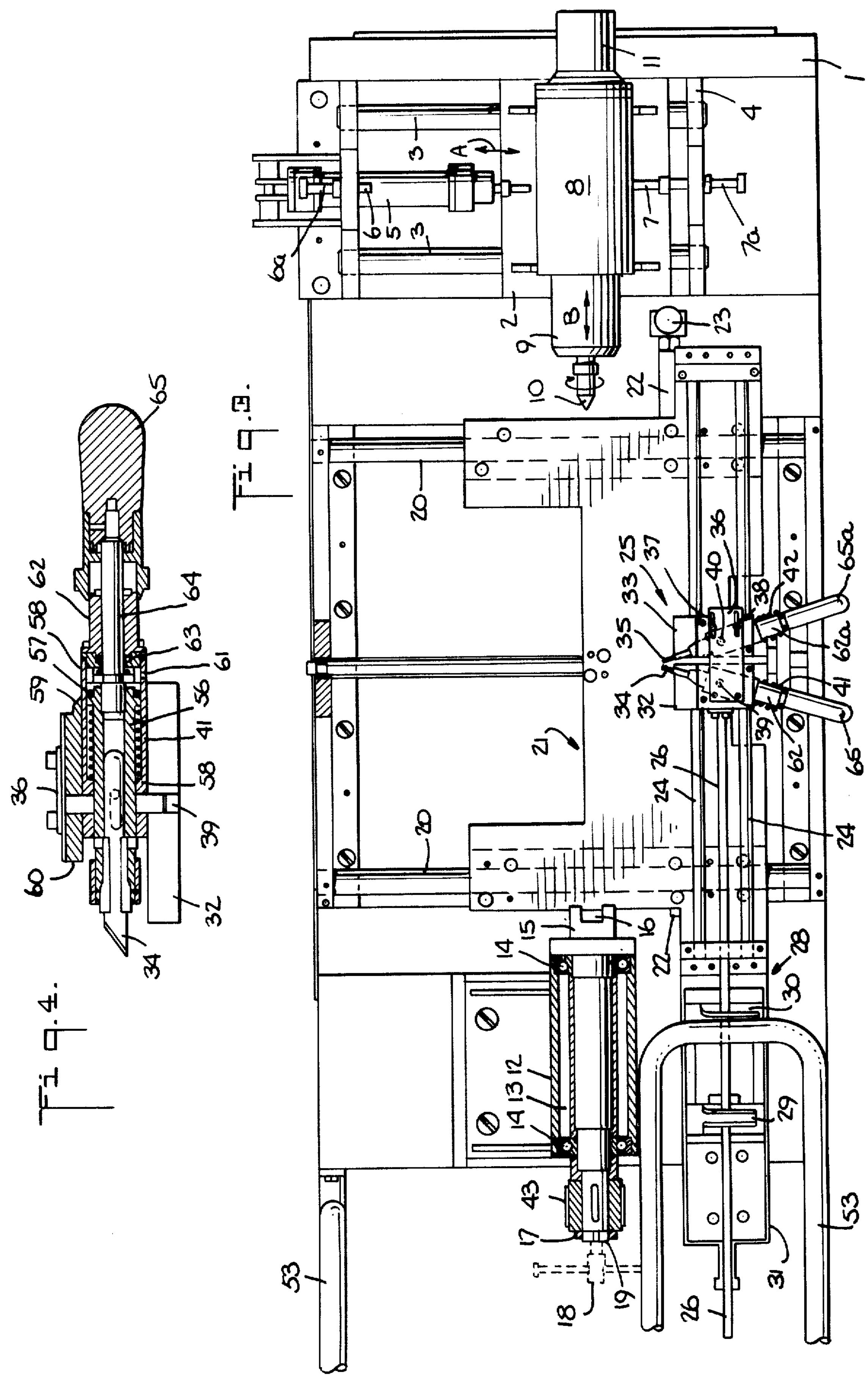
FIG. 3 is a partial top view of a further portion of the apparatus of FIG. 1.
FIG. 4 is a longitudinal cross-sectional view of a cutting element used in the apparatus of FIG. 1.

Referring to FIGS. 1 to 3, the apparatus comprises a supporting frame 1. Slidably mounted on frame 1 is a first carriage means 2 which is movable transverse to the longitudinal direction of the apparatus, as shown by the arrow A. The longitudinal direction of the apparatus is shown by the arrow B. The first carriage means 2 is slidably moved on guide rods 3 which extend between and are attached at their respective axial extremities on supports 4. The sliding movement of the first carriage means is provided by a first fluid pressure actuator 5 fixedly mounted on support 4. The actuator 5 slidably moves carriage means 2 between adjustable stops 6 and 7. Associated with each stop 6 and 7, is a respective adjusting means 6*a* and 7*a*, for varying the limit to which the actuator 5 can position the carriage means 2.

Figure 5:
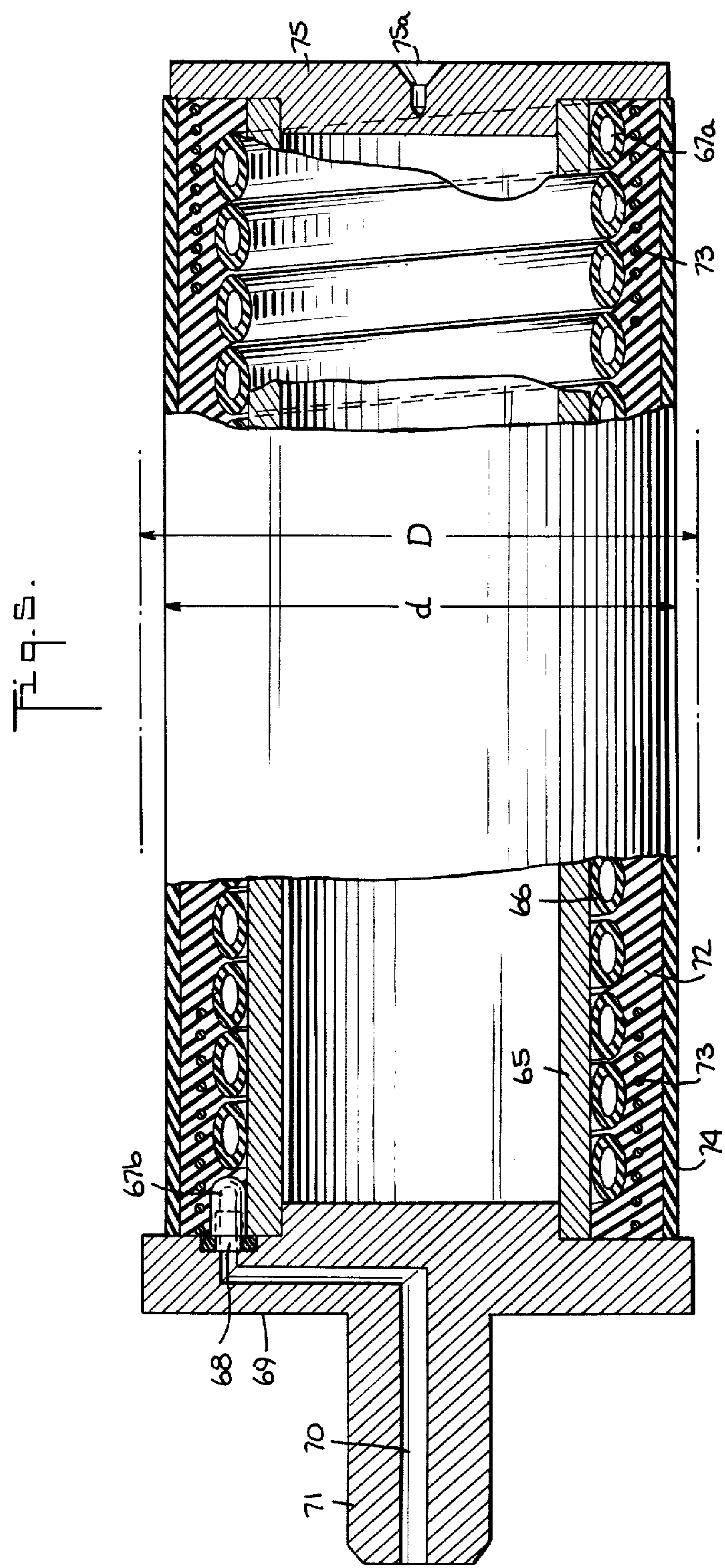
FIG. 5 is a partial cross-sectional view and schematic view of a mandrel suitable for use in the apparatus of FIG. 1.

Rigidly mounted on first carriage means 2 is a first mandrel support means 8. Extending axially inwardly from the support means 8 in the longitudinal direction of the apparatus is a chuck 9 which supports a freely rotatable centering shaft 10. Shaft 10 is shaped so as to cooperate with a complimentary shaped recess 75*a* in the mandrel so as to axially support the mandrel during rotation (FIG. 5). Shaft 10 can be moved axially and reciprocally in the direction of arrow B by a second fluid pressure actuator 11.

Located generally at a longitudinally axially spaced position from first mandrel support 8 is a second mandrel support means 12. Second mandrel support means 12 comprises a cylindrical support 13 which rotates in bearings 14. Extending axially inwardly in a longitudinal direction from support 13 is a freely rotatable coupling shaft 15. Shaft 15 is shaped to have a recess 16 which cooperates with a complimentary shaped projection 71 in the mandrel so as to axially support the mandrel during rotation (FIG. 5). Extending from the other end of support 13 is a pulley 17. Pulley 17 cooperates with a drive means, to be described hereafter, to rotate cylindrical support 13. A mandrel, to be described hereafter, which contains a tubular blank, is axially supported for rotation between the shaft 10 of the first mandrel support 8 and the recess 16 of the second mandrel support 12.

Support 13, coupling shaft 15 and pulley 17 are longitudinally bored to provide a passageway (not shown) for a fluid pressure medium. The source of a fluid pressure medium is connected to a revolving pressure joint 18 and the joint 18 is connected at 19 to the passageway. The fluid pressure is therefore supplied to the mandrel while the mandrel is rotating, as described hereafter.

Disposed on frame 1 generally between the first and second mandrel support means and transverse to the longitudinal direction of the apparatus is a plurality of guide rods 20. Slidably mounted on the guide rods 20 is a table 21. Table 21 can be locked in a desired transverse position on the guide rods 20 by a clamp 22 operated by lever 23. Extending in the longitudinal direction of the apparatus and mounted on table 21 is a plurality of parallel guides 24 to control the linear position of a cutting means 25. Extending between and parallel to guides 24 is an actuating rod 26, one end of which is attached to a cutting means carriage 27 and the other end is attached to a cutting means advance mechanism 28. The cutting means carriage 27 is slidably supported on guide 24. The cutting means advance mechanism 28 may be fluid pressure operated to cause the carriage 27 to linearly move a desired amount corresponding to the selected width of the endless annular element. The mechanism 28 comprises a pair of pressure operated clamps 29, 30 for the actuating rod 26. Clamp 29 is linearly reciprocably movable by a pressure operated means 31. Clamp 30 is fixed. Clamps 29, 30 and means 31 is a known rythmic advancing means such that the length of the advance can be adjusted by varying the stroke of the means 31 on clamp 29.

Carriage 27 comprises two independent mounting blocks 32, 33, one for each cutting element. One of the blocks 32 is fixedly attached to the carriage 27, while the other block 33 is adjustable. The location of block 33 can be adjusted so as to selectively vary the longitudinal spacing between first and second cutting elements 34, 35 disposed on respective blocks 32, 33. The adjustment is provided by a plate 36 having slots 37 and fastening means 38. The angular relationship between cutting elements 34 and 35 can also be adjusted. Each cutting element can pivot about a respective axis 39, 40 which axis is perpendicular to the longitudinal direction of the apparatus i.e., the plane of the table 21. As shown in FIG. 3, the cutting elements 34, 35 are oriented in opposite directions so as to converge. This orientation permits the cutting of endless annular elements having tapered sides, i.e., sides at an angle to each other. The cutting elements are normally maintained in a retracted position by respective bias springs 41, 42. The initial distance of the cutting elements from the tubular blank disposed between shafts 10 and 15 is determined by the position of table 21.

The rotating drive means for the mandrel comprises a drive belt 43 cooperating with pulleys 17 and 44. Pulley 44 is located on the output shaft of electromagnetic clutch (not shown). A further pulley 45 is located on the input shaft of the clutch. A belt 46 extends between pulley 45 and an adjustable pulley 47. Pulley 47 is connected to an electric motor 48. The position of pulley 47 is adjustable by a handwheel 49. Turning handwheel 49 causes link 50 to pivot pulley bracket 51 about pivot 52.

Various electrical and mechanical protective means are incorporated in the apparatus. Located in a generally surrounding relationship with the advance mechanism 28 and the second mandrel support 12 is a protective bracket 53. A operator controlled electrical circuit breaker 54 is activated by a pivoting bar 55 which extends the entire longitudinal length of the apparatus.

FIG. 4 illustrates a preferred embodiment of the cutting device of the cutting means 25. An inclined cutting element 34 mounted on a plunger 56. One end of plunger 56 acts as a piston and is surrounded by a ring gasket 57. Ring gasket 57 provides a seal between plunger 56 and housing 58. Plunger 56 can axially move within housing 58 and is maintained in the retracted position as shown in FIG. 4, by bias spring 41. Housing 58 can pivot about axis 39 which is vertical to the mounting block 32. The pivoted position of housing 58 can be determined by a pointer 59 extending from cover 60 and an angular scale marked on housing 58. A inlet 61 is provided in housing 58 for connection to a source of fluid pressure. Fluid pressure is admitted through inlet 61 and causes plunger 56 to be axially moved within housing 58 so as to advance and extend the cutting element 34. Extending from housing 58 is a bushing 62. Disposed between bushing 62 and housing 58 is a ring seal 63 to prevent the escape of pressure during operation of plunger 56. Arranged in an axial bore of bushing 62 is an extension rod 64 having at one end a handle 65. Handle 65 is securely connected to rod 64 and is capable of being manually operated so as to advance and extend cutting element 34 in the absence of the fluid pressure. A similar handle **65*a* and bushing 62*a* is associated with cutting element 35**.

FIG. 5 shows a radially expandable and contractible mandrel suitable for use in the present invention. The mandrel is fully described in commonly assigned copending U.S. Pat. application Ser. No. 350,561, now Pat. No. 3,834,257, filed Apr. 12, 1973, by Wilhelm Ganser, entitled Radially Expandable and Contractible Mandrel, the entire contents of which are hereby incorporated by reference. The mandrel comprises a supporting core 65 having a concentrically arranged radially expandable layer formed by a spirally wound hose 66. The hose is sealed by suitable means at one end **67*a* and the other end 67*b* is connected to an outlet 68 of a source of fluid pressure which acts as an inflating medium. Outlet 68 is located on a flange 69 and communicates with passageways 70 to the inflating medium source. Projection 71 from flange 69 is engaged by recess 16 on shaft 15 such that passageway 70 communicates with the source of fluid pressure connected to rotating joint 18. Concentric with and firmly attached to hose 66 is an intermediate or second layer 72 of an elastic material. The elasticity of the second layer is less than the elasticity of hose 66. A non-expandable or relatively inexpandable layer 73 is located adjacent the respective axial extremities of the mandrel. Layer 73 restrains the expansion of the mandrel surface which is not covered by the tubular blank. Concentric with and removably secured to second layer 72 is a third elastic layer 74 which forms an outer protective and wear resistant casing. Layer 74 has an elasticity less than that of the second layer 72. Layer 74 is positioned axially on the mandrel by flange 69 and a flange 75. Layer 74 forms a wear surface for the cutting elements 34, 35; however, layer 74 is easily penetrated by the cutting elements. Layer 74 is removable for purposes of replacement. Flange 75 has a shaped recess 75*a* which engages a complimentary shaped shaft 10** so as to axially rotatably support the mandrel.

In operation, the mandrel has a diameter *d* in the relaxed unexpanded condition. Diameter *d* is slightly smaller than the smallest diameter of the tubular blank or the like which is to be cut. The tubular blank is guided over the mandrel and fluid pressure is applied to hose 66. Hose 66 is inflated causing radial expansion of the intermediate second layer 72 and outer third layer 74. The radially expanded mandrel firmly grips the interior surface of the tubular blank and thereby permits the accurate cutting of endless annular elements. The radially expanded mandrel is able to provide a uniform diameter D slightly larger than the internal diameter of the tubular blank. Since the radial expansion of the elastic layers is kept within limits there is no appreciable stretching and fatigue in the layers.

Since the mandrel is able to radially expand to firmly grip a tubular blank, tubular blanks having a range of internal diameters can be cut on the same mandrel. The amount of radial expansion can be varied by the size of the hose, the applied inflation medium and the elasticity of the layers. By way of example, the radially expanded condition may be 0% to 10% greater than the relaxed uninflated condition. The elasticity of each radially expandable layer is such that when the inflating medium is removed, as by venting, the layers relax and the mandrel returns to the diameter d.

Figure 6:
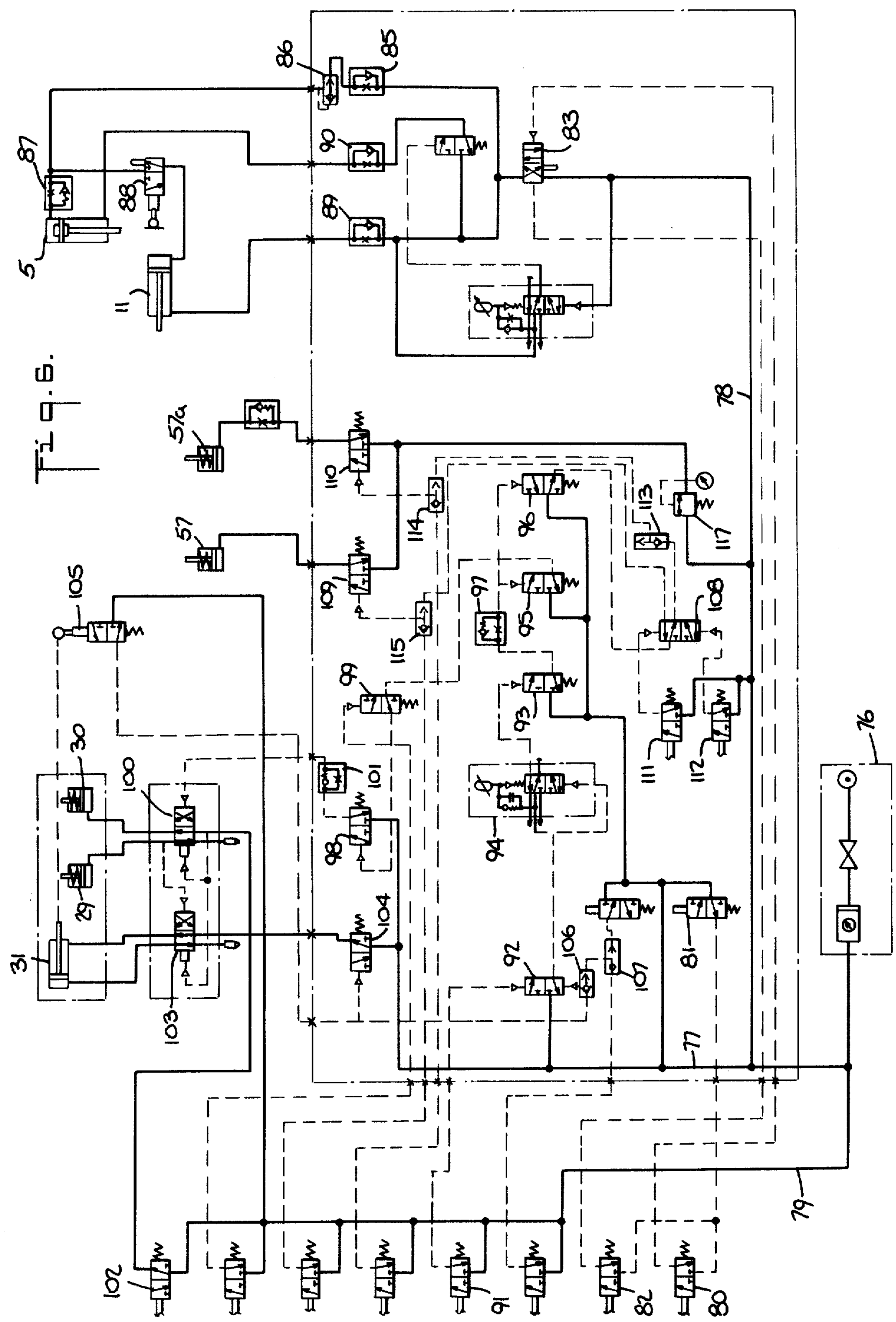
FIG. 6 illustrates in schematic a pneumatic control system for the apparatus of FIG. 1.

Referring to FIG. 6, the fluid pressure control system comprises operating and control circuits, distribution lines, valves and the like. The fluid pressure may be a liquid or a pneumatic medium. The fluid pressure is supplied to the operating and control circuits from a regulated source 76 by means of distribution lines 77, 78 and 79 and switch 80 and valve 81. A mandrel with a tubular blank mounted thereon is positioned such that shaft 15 and recess 16 engages projection 71. Manual switch 82 permits control pressure from line 77 and valve 81 to actuate valve 83 by control pressure in line 84. Actuating valve 83 permits pressure from line 78 to be provided through bleed control valve 85, check valve 86 and bleed control valve 87 to pressure actuator 5. Pressure actuator 5 slidably moves carriage 2 until stop 7 is engaged. Stop 7 allows the position of shaft 10 to be aligned with the recess **75*a* on the mandrel. When carriage 2 reaches the aligned position, a sensor valve 88 permits pressure to advance actuator 11. Actuator 11 advances shaft 10 into recess 75*a* thereby firmly securing the mandrel on the apparatus. Bleed control and check valves 89 and 90 inhibit the disengagement of actuators 5 and 11. Table 21 is then locked by clamp 22, 23 to position the cutting means 25 in relationship to the mandrel. The cutting cycle is initiated by manual switch 91. Switch 91 permits control pressure from line 79 to actuate valve 92. Actuation of valve 92 permits pressure from line 77 to be supplied to valve 93 through time control valve 94. When valve 93 is actuated, pressure is applied from line 77 to valves 95 and 96 through bleed control valve 96**.

Actuating valve 95 allows pressure from line 77 to reach valve 98 through valve 99. Valve 98 permits control pressure from line 77 to actuate two-way valve 100 through bleed control valve 101. Prior to the actuation of valve 100, fixed clamp 30 is supplied pressure through line 79 by the actuation of switch 102. Further prior to actuation of valve 100, actuating rod 26 is secured against displacement. Actuation of valve 100 releases clamp 30 and enables movable clamp 29 to engage actuating rod 26. Simultaneously pressure is applied to two-way valve 103, allowing pressure from 77 to be supplied through valve 104 to pressure operated means 31. Pressure operated means 31 causes engaged clamp 29 to advance until it comes into contact with clamp 30. Movement of clamp 29 causes actuating rod 26 to advance and thereby linearly shift the cutting means 25 on guide rods 24. When the clamp 29 contacts clamp 30, sensor valve 105 is actuated permitting pressure from line 79 to control valve 104, inhibiting pressure operated means 31, and to control valve 92 through check valves 106 and 107. Valve 92 was previously actuated by switch 91 and is returned to the position shown in FIG. 6 by sensor 105. The connection between time control valve 94 and line 77 is thereby interrupted, causing valves 93, 95 and 96 to return to the position shown in FIG. 6 after a preset time delay established by valve 94 and bleed valve 97. As a consequence the valves controlling clamps 29 and 30 and the pressure operated means 31 are returned to their initial condition and sensor valve 105 is disengaged. The return of valve 92 to an initial condition, restarts the cutting means 25 linear shifting cycle, assuming switch 91 remains activated.

During the operation described above, valve 96 is actuated from the position shown in FIG. 6 by valve 95. This interrupts the supply of pressure from line 77 to valve 108; and relieves the pressure applied to plungers 57 and 57*a* for the respective cutting elements 34 and 35. The cutting elements 34, 35 are therefore retracted by respective springs 41, 42. When the linear shifting of the cutting means 25 is completed and valves 95 and 96 are returned to the position shown in FIG. 6, pressure from line 77 is supplied to one or both valves 109 and 110. This is accomplished by manual switches 111 or 112 and valves 93 and 96, either directly or through check valves 113, 114 and 115. Assuming that switch 111 or 112 is actuated, both cutting elements 34, 35 are enabled for the cutting cycle. Pressure from valves 96 and 108 is therefore applied to valve 109 and 110 through check valves 114 and 115. The pressure is directly applied to plunger 57 of the first cutting element 34. In contrast the pressure applied to plunger 57*a* of the second cutting element 35 is throttled by the bleed valve 116. Therefore first cutting element 34 is advanced before the second cutting element 35, and the first cutting element completes a cut of the tubular blank before the second cutting element initiates a cut. The first cutting element 34 remains in the forward and extended position until the second cutting element 35 is advanced to the extended position and completes a cut of the tubular blank.

During the sequencing of the cutting elements 34, 35 a further cycle is begun by the actuation from line 79 and switch 91 of valve 92 from the position shown in FIG. 6. Valves 95 and 96 are reactuated and the plungers 57 and 57*a* are simultaneously returned to their initial positions. The advance of the plungers 57 and 57*a* may be controlled by the pressure adjusting device 117, which is located between valves 109 and 110 and line 78. It is to be understood that the advance and retraction of the cutting elements 34, 35; the rotation of the mandrel and the linear shifting of the cutting means 25 is synchronized so as to sequentially produce the desired endless annular elements from the tubular blank.

Figure 7:
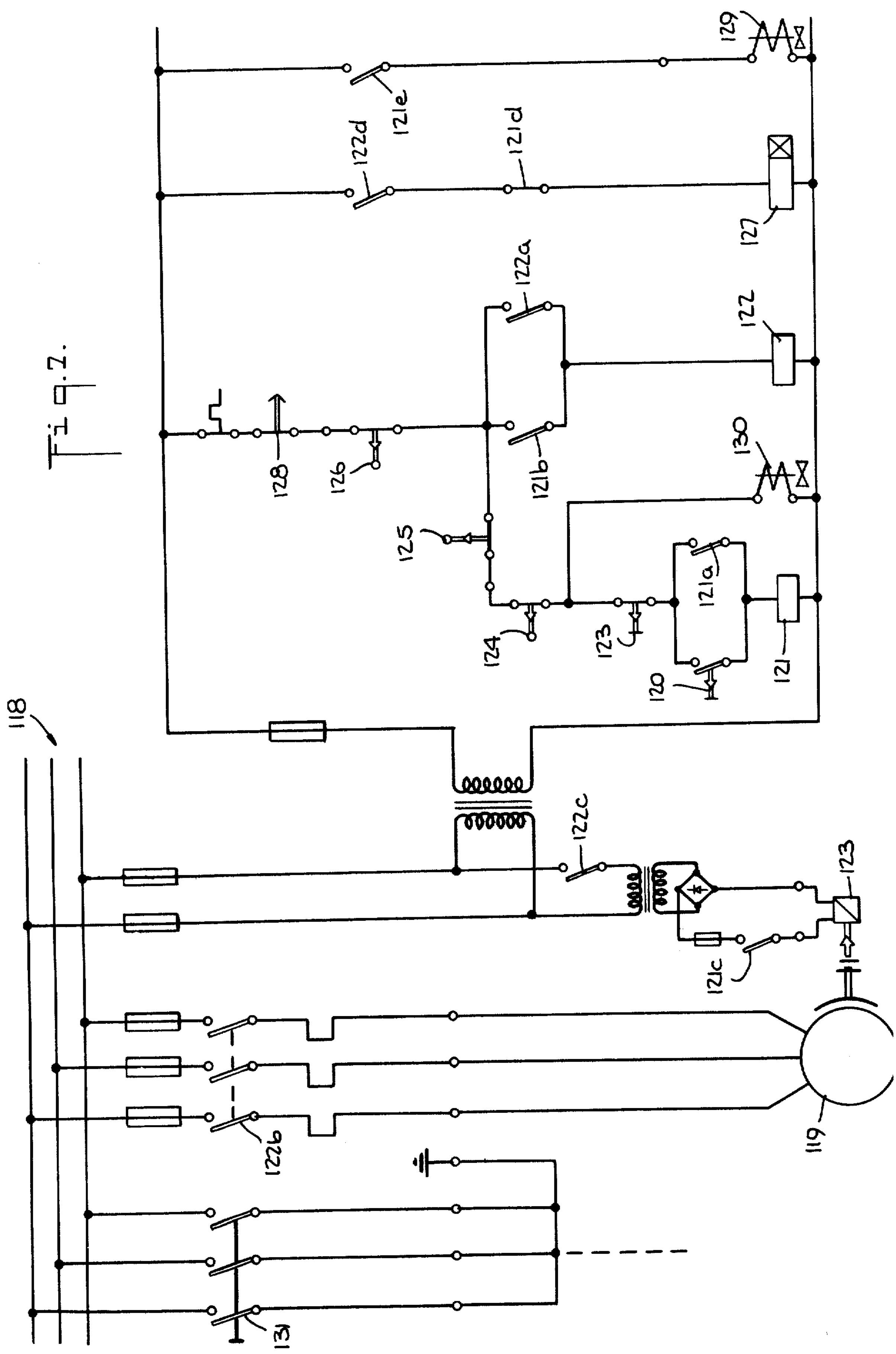
FIG. 7 illustrates in schematic an electrical circuit system for the control of the apparatus of FIG. 1.

Referring to FIG. 7, a source of electrical power 118 is made available to motor 119 by control switch 120. Closing switch 120 connects source 118 with relay 121 and closes locking contact 121*a* to maintain relay 121 energized when releasing switch 120. Contact 121*b* is also closed thereby energizing relay 122 and locking contact 112*a* for relay 122. Energizing relay 122 closes contacts 122*b* connecting motor 119 to the power source 118. Energizing relays 121 and 122 closes contacts 121*c* and 122*c* engaging clutch 123 for motor 119. The control circuit includes a main circuit breaker switch 123 and three emergency circuit breaker switches 124, 125 and 126. One of the emergency circuit breaker switches corresponds to switch 54. Energizing of relay 122 closes contact 122*d* and enables energizes relay 127 through contact 121*d* when relay 121 is deenergized releasing clutch 123 from the motor 119. Energizing relay 127 permits the motor 119 to rotate the mandrel. Switch 128 deenergizes relays 121 and 122 thereby removing electrical power from motor 119. Operating and control pressure is applied by the energizing of relay 121 which activates motor valve 129. The release of switch 128 will also energize motor valve 130 and shut off the availability of pressure. Electrical power for further requirements of the apparatus, e.g., timers, indicator lights, is available by switch 131.

In operation, especially when cutting the tubular blank for tapered endless annular elements, the sequence and control of the cutting elements is significant. Since the sides of the annular element are at a desired angle to each other, the angle being for example from 0 to 30°, an annular scrap strip is necessary between each element. The first cutting element is advanced and completes a cut of the tubular blank. The first cutting element remains extended and serves as a support for the cut side of the tubular blank when the second cutting element is extended and completes a cutting cycle.

Maintaining the first cutting element in the extended position prevents the axial movement on the mandrel of the annular element as it is being cut. Avoiding such movement is especially important for annular elements which are relatively narrow in width since such elements are readily flexible.

It is understood that the electrical and pressure control and operation system includes switches, valves, regulators, relays and the like for venting, actuating, switching, deactivating, reversing and deenergizing the condition of the switches and valves in order to control and sequence the apparatus. The control and sequencing may be manual or automatic, and may include applying and venting inflating pressure to the hose 66; release of the shaft 10 from recess 75*a;* rotation of the mandrel at various speeds and in either direction; release of clamps 29 and 30; advance and retraction of one or both cutting elements 34, 35, either separately in any sequence or simultaneously; the presurizing and venting of pressure actuated means 5, 11 and 31; the automatic and continuous operation or the intermittent operation of the cutting cycle; and automatic shut-off at the completion of a cutting cycle or in the event of apparatus malfunction. Other control and operation functions can be determined by those skilled in the art.

While there has been described a preferred embodiment of the invention it will be obvious to those skilled in the art that various changes and modifications may be made without departing from the invention, and it is, therefore intended to include any such changes and modifications as fall within the scope of the appended claims.

What is claimed is:

1. An apparatus for the manufacture of endless annular elements from a tubular blank comprising
 a mandrel for supporting the tubular blank along a longitudinal axis;
 means for rotatably supporting the mandrel;
 a cutting means spaced from the mandrel, said cutting means including a first and second cutting element, the cutting elements being longitudinally spaced from each other along the axis;
 means for extending the first and second cutting elements to penetrate the rotating tubular blank whereby one of the cutting elements maintains the tubular blank in position when the other cutting element penetrates the blank; and
 means for retracting the first and second cutting elements.

2. An apparatus according to claim 1 comprising means for orienting the first and second cutting elements at a selected angle of penetration with respect to the axis of the tubular blank.

3. An apparatus according to claim 1 including means for sequentially extending the cutting elements comprises means for extending the first cutting element and maintaining it in the extended position to axially support the tubular blank and means for extending the second cutting element while the first cutting element is extended.

4. An apparatus according to claim 1 wherein the retracting means simultaneously controls the first and second cutting elements.

5. An apparatus according to claim 1 wherein the mandrel comprises a plurality of concentric elastic layers the inner concentric layer being inflatable.

* * * * *